Sept. 20, 1971    B. A. ROLLAND    3,605,929
ONE RIDER GOLF CART
Filed July 7, 1969    2 Sheets-Sheet 1
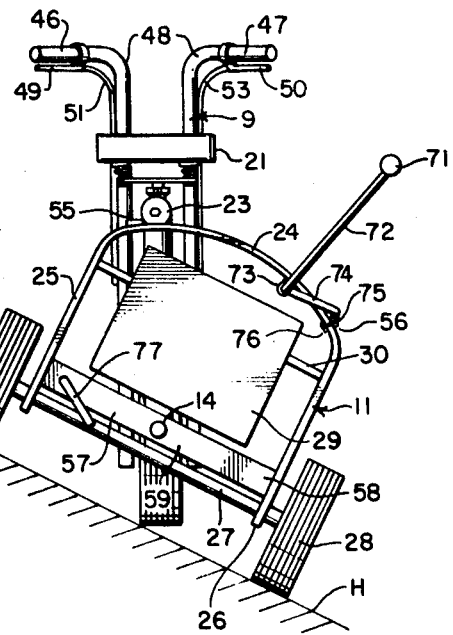
INVENTOR:
BURTON A. ROLLAND
ATTORNEY Sept. 20, 1971  B. A. ROLLAND  3,605,929
ONE RIDER GOLF CART
Filed July 7, 1969  2 Sheets-Sheet 2
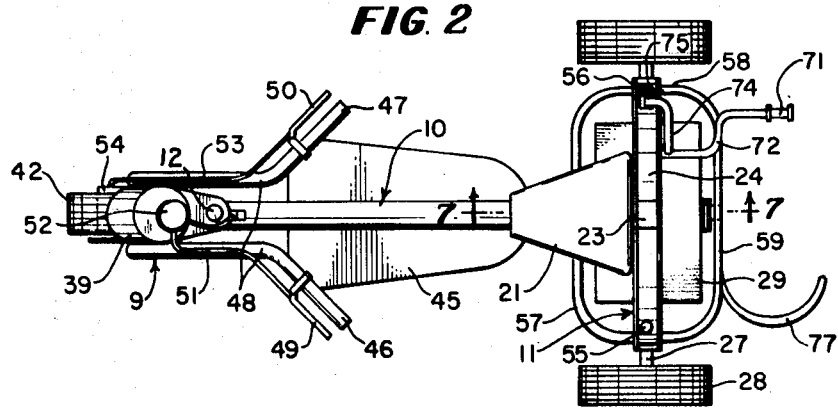
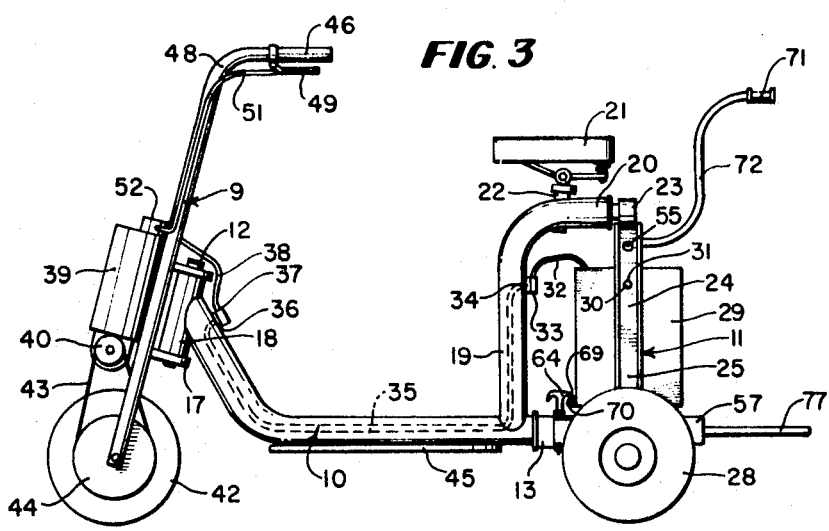
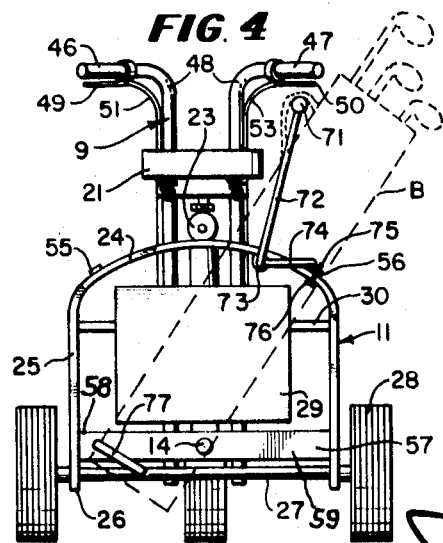
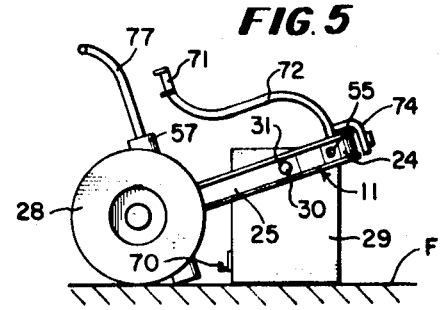
INVENTOR:
BURTON A. ROLLAND
ATTORNEY United States Patent Office 3,605,929
Patented Sept. 20, 1971

3,605,929
ONE RIDER GOLF CART
Burton A. Rolland, 332 Dawson Ave.,
Rockford, Ill. 61107
Filed July 7, 1969, Ser. No. 839,298
Int. Cl. B62d 61/08
U.S. Cl. 180—26                           15 Claims

ABSTRACT OF THE DISCLOSURE

The three-wheel cart comprises three sub-assemblies designed to be easily assembled and disassembled, namely, a front steering fork assembly detachably connected by a withdrawable king-pin with the front end of the front frame assembly, on which the driver's seat is carried, and a rear frame assembly pivotally and detachably connected to the rear end of the front frame assembly by means of an axle working in a fore and aft rear lower bearing, spacer sleeve and pilot bearing, two withdrawable pins detachably connecting the bearing with the lower portion of the rear frame assembly. Each sub-assembly is light enough and compact enough to be handled readily and stored in the trunk of an average sized automobile for transportation. The drive means is carried on the front fork and transmits drive to the front steerable wheel, and brake means is also provided working on the same wheel. A rigid upright frame of inverted U-shape on the rear frame assembly has an arcuate track on its upper end struck on an arc with the rear axle as a center and has a roller on the back of the seat support running thereon between widely spaced stops, allowing a wide range of tilting of the front fork and front frame relative to the rear frame for operation like a bicycle or motorcycle. The upright frame also has a battery carrier case pivotally suspended therein permitting upright positioning of the battery with the case during transportation independently of the rest of the rear frame assembly, the two withdrawable connector pins having head ends that hook onto the carrier case when the cart is assembled to hold the carrier case in rigid relationship to the upright frame.

---

This invention relates to a three-wheeled motor vehicle adapted for a wide variety of uses, although primarily designed as a single rider golfcart.

The vehicle combines the side tilting feature of a bicycle or motorcycle insofar as the pivoted front fork with its steerable wheel and the front frame assembly carrying the seat are concerned, the rear frame assembly carrying the pair of rear wheels being pivoted on a low fore and aft horizontal axis with respect to the front frame to tilt to the necessary extent and adapt itself nicely to side hill running while the rest of the vehicle travels the same as on flat terrain with substantially the same ease of maneuvering.

Another important feature of the invention is the ease with which it can be taken apart into three sub-assemblies, each small and light enough to be handled easily by the average adult, this feature also making for such compactness in storing as to permit transporting of these sub-assemblies easily in the average sized trunk of an automobile, the connections between the assemblies being also of a kind that permit quick and easy removal and replacement of parts without the necessity of using any tools.

Another important feature is the provision of an arcuate channel shaped track on the top of the upright frame portion of the rear frame assembly on which runs a roller on the rear end of the front frame behind the passenger seat as the front frame tilts with respect to the rear frame, giving the following advantages:

(1) The low rear horizontal bearing about which the lateral pivoting occurs can be located close to the ground, thereby enabling the vehicle to maintain a vertical position for the front frame and thereby simulate the balancing characteristics of a bicycle or motor cycle;

(2) The arcuate channel track and roller assume a good portion of the weight of the rider, thus relieving the lower bearing of too much load;

(3) Turning of the roller on the arcuate track portion of the rear frame affords enough frictional resistance to overcome any tendency of the rear frame to rotate too freely about the lower bearing as an axis due to the weight of the rider or shock loads due to rough terrain, the lower bearing also incorporating a means for adjusting the frictional resistance to pivotal action to suit the weight of the rider for even better riding, and (4) The arcuate track on the rear frame provides a convenient place to provide stops to limit pivoting of the two frame assemblies with respect to one another for operation within a safe range, these stops being located at the maximum radius with respect to the pivot bearing to provide maximum strength.

Another important feature is the provision of a rear bearing and an axially spaced pilot bearing for pivotal mounting of the rear frame assembly with respect to the front frame assembly, thus assuring good stability of the rear wheels whenever unequal forces act on the horizontally tending to rotate the rear frame about an axis vertical with respect to the rear end of the front frame.

A further feature of importance is the rigid upright open frame portion of the rear frame assembly designed to suspend therein a pivoted carrier case for a battery, the case being held rigidly in the upright frame in a vertical position during use of the vehicle but, during transportation of the vehicle in knocked-down condition, the pivoting of the carrier case with respect to the upright frame below the arcuate track portion enabling resting the carrier case on its bottom in a vertical position during transportation, a channel bracket being provided on the front of the carrier case to cooperate with the hooked ends of draw pins that are inserted in holes in the rear frame assembly to connect it through straps on the rear bearing with the front frame assembly, whereby to prevent swinging of the carrier case about its pivots relative to the upright frame during operation of the vehicle.

The invention is illustrated in the accompanying drawings, in which:

FIG. 1 is a perspective view of a three-wheeled motor vehicle made in accordance with my invention:

FIGS. 2, 3 and 4 are, respectively, a top view, a side view, and a rear view of the vehicle, the latter having indicated in dotted lines how a golf bag can be carried on the rear carrier bracket;

FIG. 5 is a side view of the rear frame assembly disconnected from the rest of the vehicle for transportation, showing how the battery carrier case, pivoted relative to the rear frame, stands in a vertical position for proper positioning of the battery therein during transportation;

FIG. 6 is a rear view of the vehicle traveling across a side hill and illustrating the stop feature;

FIG. 7 is a sectional detail of the rear bearing and cooperating spacer sleeve and pilot, taken on line 7—7 of FIG. 2, and FIG. 8 illustrates the application of the principle of my invention to a tricycle.

The same reference numerals are applied to corresponding parts throughout the views.

Referring to the drawings, the reference numerals 9, 10 and 11 designate the three sub-assemblies that can be put together readily and taken apart just as readily, in accordance with the present invention, namely, the front steering fork assembly 9, the front frame assembly 10, connected with the front fork assembly by a king-pin 12, and the rear frame assembly 11 pivotally connected to the rear end of the front frame assembly 10 by means of the rear lower bearing 13 and spacer sleeve 13' and pilot 13", the rearwardly extending pivot axle 14 of the front frame 10 extending through bearing 13 and spacer sleeve 13' and secured against removal by nuts 15 threaded as at 16 to the reduced threaded rear end portion of the axle that terminates in the further reduced smooth pilot 13" received in a bearing 60 on the rear frame assembly, to which further reference is made hereinafter. Two pins 64, to which further reference is made hereinafter, serve to tie the bearing 13 to the rear frame assembly 11 to detachably connect the assemblies 10 and 11 together. A clevis 17 extends rearwardly from the front fork 9 to receive the upright kingpin bearing 18 of the front frame assembly 10 therein through which the pin 12, previously refererd to, extends. A substantially vertical post 19 rigid with the rear end portion of the front frame 10 has a substantially horizontal rearwardly extending upper end portion 20 on which the seat 21 is suitably mounted for a certain amount of vertical adjustment, as indicated at 22. This rearward extension 20 also carries a roller 23 which runs in a channel track 24 that is struck on an arc with the axle 14 as a center, this track being the upper transverse portion of a rigid upright frame of inverted U-shape, the side portions 25 of which are connected as at 26 with the opposite ends of the rear axle 27. The latter carries the rear wheels 28 on its opposite ends suitably mounted for easy turning. The large generally rectangular opening afforded in the upright frame 24–26 provides a convenient place in which to pivotally suspend the battery carrier case 29 on horizontal pivot rods 30 received in bearing holes 31 provided in the side portions 25 of the upright frame. A flexible conduit 32 containing the leads from the battery in the case 29 has a connector plug 33 on its outer end that plugs into a receptacle 34 from which a flexible conduit 35 extends through the tubular post 19 and tubular frame 10 to another receptacle 36 at the front end of the frame 10 where a plug 37 plugging into it has the flexible conduit 38 containing leads for connection with the two-speed electric motor 39 mounted for drive purposes on the front fork 9. This motor has a drive pulley or sprocket 40 driven thereby through reduction gearing in the housing 41 to drive the front steerable wheel 42 by means of a belt or chain 43 and pulley or sprocket 44, the ratio of pulleys or sprockets 40 and 44 providing a further speed reduction. The driver sitting on seat 21 and resting his feet on the hinged foot rests 45, steers the vehicle by grasping the handles 46 and 47 provided on the handlebars 48, controlling the motor 39 by manipulation of the pivoted lever 49 with his left hand and applying the brake by manipulation of the pivoted lever 50 with his right hand. Lever 49 has a flexible cable extending from it through a conduit 51 to operate the two-speed switch 52, controlling the motor 39, while pivoted lever 50 has a flexible cable connected therewith and extending through a conduit 53 to brake means 54 provided on one side of the front steerable wheel 42 and operable in a manner well known in the bicycle art, the brake being commonly referred to as an English band type brake.

In operation, it is clear that by removing the pin 12 and disconnecting the plug 37, the front fork assembly 9, is free and, being of light tubular construction, can be easily lifted and handled by any adult or even a teen-ager and placed in the luggage compartment of an average sized automobile. Likewise the rear frame assembly 11 can be easily disconnected from the front frame assembly 10 by disconnecting the plug 33 and removing the pins 64 after running the roller 23 off one end of the track 24 by swinging frame 10 laterally relative to frame 11, or vice versa. Then the front frame assembly 10 and the rear assembly 11 are free, and both are light enough, as well as small enough, to permit handling them in the same manner as the front fork assembly 9 in storing the same in the luggage compartment. FIG. 5 shows the advantage of the pivoted battery carrier case 29, namely, that it can stand upright on the floor F of the luggage compartment during transportation. This feature, as well as the folding upwardly of the foot rests 45, as indicated in dotted lines in FIG. 1, is of advantage in the storage of these assemblies in a luggage compartment or anywhere else. One of the two stops 55 and 56 is removable from the end of the arcuate track 24 to enable running roller 23 off the track 24 at the time the pins 64 are to be pulled out to disconnect the frames 10 and 11. The stops 55 and 56 serve to limit the pivoting of the rear frame assembly 11 with respect to the front frame assembly 10, one of these limit positions being illustrated in FIG. 6 wherein the roller 23 has come into abutment with stop 55. It is clear from FIG. 6, which shows a fairly extreme side hill H, that the rider can run across such a side hill with substantially the same ease as on flat terrain and with about as good maneuverability as with a bicycle or motorcycle, for example, due to the lowness of the rear axle 14. This axle, incidentally, could be brought still lower than it is shown now, by merely dispensing with the straight rear axle 27 and utilizing one having a depressed middle portion, and that in turn would make it unnecessary to use as small rear wheels as are now shown at 28, since larger diameter rear wheels would, of course, make for much easier riding. The generally rectangular bottom frame 57 provides the necessary clearance for swinging of the battery case 29 about its pivots 30, and this frame 57 is welded or otherwist suitably secured at its ends 58 to the side portions 25 of the upright frame 24–25 and provides a rear cross-portion 59 extending the full width of the frame 24–25 in which the pilot bearing 60 receives the reduced rear end pilot portion 13" of the axle 14 previously mentioned. The frame 57 has a gap 62 at the middle of its front cross-portion through which the bearing 13 extends along with spacer sleeve 13'. There are two parallel horizontal plates 63 welded to the top and bottom of the bearing 13 which, when the assemblies 10 and 11 are being connected together by means of the pins 64 entered in registering holes 65 in the plates and frame 57, serve to insure adequate strength and rigidity for the rear frame assembly 11 and at the same time good support for the pivot axle 14 in bearing 13 and pilot 13" in bearing 60. Of course, the location of the roller 23 running on track 24 at a maximum radius with respect to the pivot axle 14 makes for excellent weight distribution and assures smooth riding and minimum vibration. It was pointed out before that the roller 23 and track 24 afford a desirable amount of frictional resistance to pivotal movement of the frame 10 relative to frame 11. The nuts 15 can be tightened against washer 66 (FIG. 7) to press plate 67, that is welded to the front end of spacer 13', against the bearing 13 and crowd it against another plate 68, that is welded to the front end portion of the axle 14, whereby to provide as much or as little frictional resistance to turning of axle 14 and accordingly better suit the needs of the rider, a heavier one requiring more resistance than a lighter one, obviously. In passing, it will be seen that the pins 64 have hooks 69 on their head ends to engage over one side of a channel 70 provided on the front of the lower portion of the battery carrier case 29 to hold the case against swinging while the vehicle is in use as should be clear from FIGS. 1 and 3.

A golf bag is indicated in dotted lines at B in FIG. 4, suspended by means of its handle on a suitable rack 71 provided on the outer end of an arm 72 pivoted to the underside of the arcuate track 24, as at 73, and having another arm 74 nearly at right angles thereto and carrying the stop 56 previously referred to on its outer end engaging in one end of the track 24. A C-shaped spring clip 75, pivoted at 76 on the underside of track 24 serves to detachably secure the stop 56 in place and at the same time hold the arms 72 and 74 against pivoting with respect to bearing 73 until such time as the rear frame assembly 11 is to be disconnected from the front frame assembly 10, when it is necessary to run roller 23 off the track 24. A secondary lower level support 77 of arcuate form is provided on the back of the frame 57 and may, if desired, have a retaining strap provided on the end thereof to extend around and secure the lower end of the bag B thereto.

While I have, for simplicity, disclosed the use of an electric motor 39 for drive purposes it should, of course, be understood that a small internal combustion engine of a size suitable for the present purposes could be used instead, in which case the pivoted lever 49 would be so connected with the carburetor to serve as the throttle control, the motor while idling being automatically disconnected from its drive connection with the front steerable wheel 42 and being reconnected automatically only upon the speeding up of the engine. The same battery carrier case 29 would be used in conjunction with the engine. Also I may have an engine mounted on the rear frame assembly 11 driving a fluid drive pump, continuously circulating the oil or other drive fluid at different rates between a sump and the fluid driven motor on the steering frame 9, in which case the lever 49 besides controlling speed controls a valve which, during idling, by-passes the fluid back to the sump instead of to the motor.

In conclusion, attention is called to FIG. 8 in which I have shown a tricycle T in which the frame 10', that is rigid with the usual head 18' at its front end for pivotal support of the upper end of the front fork 9' to which the handlebar 48' is attached in the usual way, has a rear pivotal axle 14' received in an elongated bearing 13a for the same side wise tilting of the frame 10' as in the three wheeled vehicle first described, and for similar reasons. In this case, the pedals 45' are, of course, rotatably mounted on the ends of the crank arms C used in propelling the front steerable wheel 42', while the rear wheels 28' are mounted on opposite ends of the support S for the rear pivot axle bearing 13a or in a separate axle secured to said support. Here again, the rider seated on the seat 21' carried on the frame 10' balances himself the same as on a bicycle or motorcycle, and any suitable provision may be made at the bearing 13a for limiting the range of pivotal movement of the frame 10' with respect to the bearing 13a similarly as in the vehicle first described.

It is believed the foregoing description conveys a good understanding of the objects and advantages of my invention. While a preferred embodiment of the invention has been illustrated and described, this is only for the purpose of illustration, and it is to be understood that various modifications in structure will occur to be a person skilled in this art.

I claim:

1. A three-wheeled vehicle comprising a front steering fork having a manually operable steering means and carrying a ground engaging front steerable wheel turning on a horizontal axis, a seat carried on a supporting frame that is pivotally supported at its front end on said front steering fork on an upright axis and having a rearwardly directed substantially horizontal pivotal axle on its rear end at an elevation spaced appreciably below the seat, a rear frame in transverse relationship to said seat supporting frame carrying an elongated rear bearing at the middle thereof in the fore and aft vertical plane of said seat supporting frame in which said pivotal axle is pivotally mounted and held against endwise displacement, and a pair of coaxially disposed rear wheels at opposite ends of said rear frame for supporting the same, the aforesaid elongated axle receiving bearing extending forwardly and rearwardly to substantially equal extent relative to the axis of said rear wheels for load distribution in substantially balanced relationship thereto.

2. A vehicle as set forth in claim 1 including a manually withdrawable king pin as part of the pivotal steering connection between the front end of said seat supporting frame and said front steering fork permitting easy disconnection and reconnection of said frame and fork.

3. A vehicle as set forth in claim 1 including manually removable pins in registering openings provided in the rear frame and bearing at the pivotal connection between said pivotal axle and said rear bearing permitting easy disconnection and reconnection of said seat supporting frame and rear frame.

4. A vehicle as set forth in claim 1 including means for detachably mounting the rear bearing for said pivotal axle on said rear frame, said rear bearing having means for securing the same in assembled relationship to said axle.

5. A three-wheeled vehicle comprising a front steering fork having a steering means and carrying a front steerable wheel, a seat carried on a supporting frame pivotally supported at its front end on said front steering fork on an upright axis and having a rearwardly directed substantially horizontal pivotal axle on its rear end at an elevation spaced appreciably below the seat, a rear frame in transverse relationship to said seat supporting frame carrying an elongated rear bearing at the middle thereof in the fore and aft vertical plane of said seat supporting frame in which said pivotal axle is pivotally mounted and held against endwise displacement, a pair of rear wheels at opposite ends of said rear frame for supporting the same, and means rigid with said rear frame defining an arcuate track in a substantially vertical plane the arc of which is struck on a radius with said pivotal axle as a center and having a roller running thereon through which the weight of the rider sitting on said seat is to a large extent transferred directly to said rear frame.

6. A vehicle as set forth in claim 5 including a load carrier pivotally suspended in said rear frame on a substantially horizontal axis cross-wise relative to and inside said arcuate track.

7. A vehicle as set forth in claim 5 including stop means limiting the travel of said roller to a predetermined extent either way from a mid-position.

8. A vehicle as set forth in claim 5 including a stop means limiting the travel of said roller to a predetermined extent either way from a mid-position, the stop at one end of the travel being removable to permit running of the roller off said track when disassembling the rear frame from the seat supporting frame.

9. A vehicle as set forth in claim 5 including stop means limiting the travel of said roller to a predetermined extent either way from a mid-position, the vehicle including a load carrier bracket pivotally mounted on said upright frame and carrying one of the stops which is removable from one end of the arcuate track to permit running of the roller off said track when disassembling the rear frame from the seat supporting frame.

10. A vehicle as set forth in claim 5 including stop means limiting the travel of said roller to a predetermined extent either way from a mid-position, the vehicle including a load carrier bracket pivotally mounted on said upright frame and carrying one of the stops which is removable from one end of the arcuate track to permit running of the roller off said track when disassembling the rear frame from the seat supporting frame, there being means detachably securing said stop to said track whereby to hold said carrier bracket against pivotal movement.

11. A three-wheeled vehicle comprising a front steering fork having a steering means and carrying a front steerable wheel, a seat carried on a supporting frame pivotally supported at its front end on said front steering fork on an upright axis and having a rearwardly directed substantially horizontal pivotal axle on its rear end at an elevation spaced appreciably below the seat, a rear frame in transverse relationship to said seat supporting frame carrying an elongated rear bearing at the middle thereof in the fore and aft vertical plane of said seat supporting frame in which said pivotal axle is pivotally mounted and held against endwise displacement, a pair of rear wheels at opposite ends of said rear frame for supporting the same, and an upright frame of generally inverted U-shape rigid with said rear frame defining an arcuate track on the transverse upper portion thereof behind said seat struck on an arc with said pivotal axle as a center, said seat supporting frame including an upright post carrying said seat on a rearwardly directed upper end portion thereof, said rearwardly directed upper end portion also carrying a follower riding on said arcuate track.

12. A vehicle as set forth in claim 11 wherein there is power means for propelling the front steerable wheel requiring a battery for electrical current, said upright frame having a battery carrier case mounted therein.

13. A vehicle as set forth in claim 11 wherein there is power means for propelling the front steerable wheel requiring a battery for electrical current, said upright frame having a battery carrier case mounted therein, said rear frame with said upright frame being disconnectable from said seat supporting frame, and said battery carrier case being pivotally suspended in said upright frame to permit upright positioning of said battery carrier case for support on its bottom independently of the position of said upright frame.

14. A vehicle as set forth in claim 11 wherein there is power means for propelling the front steerable wheel requiring a battery for electrical current, said upright frame having a battery carrier case mounted therein, said rear frame with said upright frame being disconnectable from said seat supporting frame, and said battery carrier case being pivotally suspended in said upright frame to permit upright positioning of said battery carrier case for support on its bottom independently of the position of said upright frame, there being means preventing pivotal movement of said battery carrier case relative to said upright frame when the battery is in use on said vehicle.

15. A vehicle as set forth in claim 11 including adjustable means for varying the frictional resistance to turning of the pivotal axis in the rear bearing.

References Cited

UNITED STATES PATENTS

| | | | |
|---|---|---|---|
| 2,819,093 | 1/1958 | Geiser | 180—27X |
| 2,878,032 | 3/1959 | Hawke | 280—112X |
| 3,134,607 | 5/1964 | Doll | 280—111X |
| 3,289,780 | 12/1966 | Ferris | 180—26 |
| 3,504,934 | 4/1970 | Wallis | 280—112 |

KENNETH H. BETTS, Primary Examiner

U.S. Cl. X.R.

280—111, Digest 5